United States Patent
Bahadur et al.

(10) Patent No.: US 6,242,058 B1
(45) Date of Patent: Jun. 5, 2001

(54) METHOD FOR FORMING COATINGS FROM RADIATION CURABLE COMPOSITIONS CONTAINING ALKENYL ETHER FUNCTIONAL POLYISOBUTYLENES

(75) Inventors: Maneesh Bahadur; Toshio Suzuki, both of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/570,486

(22) Filed: May 12, 2000

(51) Int. Cl.$^7$ ........................................... C08J 7/04
(52) U.S. Cl. .................. 427/515; 427/387; 427/558; 427/559; 427/595
(58) Field of Search ......................... 427/515, 558, 427/559, 595, 387

(56) References Cited

U.S. PATENT DOCUMENTS

| | | | |
|---|---|---|---|
| 4,474,830 | 10/1984 | Taylor | 427/54.1 |
| 4,514,037 | 4/1985 | Bishop et al. | 350/96.23 |
| 4,617,238 | 10/1986 | Crivello et al. | 428/452 |
| 5,181,269 | 1/1993 | Petisce | 385/128 |
| 5,270,423 | 12/1993 | Brown et al. | 528/15 |
| 5,536,529 | 7/1996 | Shustack | 427/163.2 |
| 5,594,042 | 1/1997 | Glover et al. | 522/31 |
| 5,629,095 | 5/1997 | Bujanowski et al. | 428/447 |
| 5,665,823 | 9/1997 | Saxena et al. | 525/106 |
| 5,973,020 | 10/1999 | Kerr, III et al. | 522/25 |
| 5,985,952 | 11/1999 | Levy | 522/102 |
| 6,054,549 | 4/2000 | Bahadur et al. | 528/29 |
| 6,069,185 | 5/2000 | Bahadur et al. | 522/25 |

FOREIGN PATENT DOCUMENTS

| | | | |
|---|---|---|---|
| 462389 | 12/1991 | (EP) | C08G/77/14 |
| 562922 | 9/1993 | (EP) | C08G/77/04 |
| WO 91/04992 | 4/1991 | (WO) | C08F/8/00 |
| WO 92/11295 | 7/1992 | (WO) | C08F/2/54 |

OTHER PUBLICATIONS

Polymers for High Technology, ACS Symposium Series: 346, American Chemical Society, by L.L. Blyler, Jr., F.V. DiMarcello, A.C. Hart, & R.G. Huff, published 1987, Chapter 34, p 410. (No month avail.).

Polymer Bulletin, by T.P. Liao & J.P. Kennedy, published 1981, V. 6, pp 135–141 (No month avail.).

Journal of Polymer Chemistry, by J.P. Kennedy & B. Ivan, published 1990, V. 28, p 89 (No month avail.).

RadTech North America Proceedings, Radiation Curing of Butyl Polymers for Pressure Sensitive Adhesives, by N.A. Merrill, I J. Gardner, & V.L. Hughes, published 1992, V. 1, pp 77–85. (No month avail.).

Polymer Bulletin, by J.P. Kennedy et al, published 1991, V.25, p. 633 (No month avail.).

Applied Polymer Science, ACS Symposium Series; 285, Polymer Coatings for Optical Fibers, American Chemical Society, Washington, DC, published 1985, pp. 907–930 (No month avail.).

Angewandte. Chem. Int. Ed. Engl. 30, by Hitchcock et al., published 1991, pp. 438–440 (No month avail.).

*Primary Examiner*—Bernard Pianalto
(74) *Attorney, Agent, or Firm*—Timothy J. Troy

(57) ABSTRACT

A method for forming coatings from radiation curable compositions comprising an alkenyl ether functional polyisobutylene, a cationic photoinitiator, and optionally a free radical photoinitiator and/or an alkenyl ether compound which is free of isobutylene units on to components such as fiber optics where the component is at a temperature greater than about 50° C. and preferably at a temperature within a range of greater than about 80° C. to 120° C. The coating may be overcoated with an acrylate functional polymer.

23 Claims, No Drawings

METHOD FOR FORMING COATINGS FROM RADIATION CURABLE COMPOSITIONS CONTAINING ALKENYL ETHER FUNCTIONAL POLYISOBUTYLENES

FIELD OF THE INVENTION

This invention is a method for forming coatings from radiation curable compositions. More particularly, this invention relates to forming coatings from radiation curable compositions comprising an alkenyl ether functional polyisobutylene, a cationic photoinitiator, and optionally a free radical photoinitiator and/or an alkenyl ether compound which is free of isobutylene units on to components such as fiber optics where the component is at a temperature greater than about 50° C. and preferably at a temperature within a range of greater than 80° C. to about 120° C. The coating may be overcoated with an acrylate functional polymer.

BACKGROUND OF THE INVENTION

In order to protect their surface from damage caused by abrasion, optical fibers are typically coated with one or more polymers as they are drawn. Typically the fibers are drawn from a heated glass blank and coated by an in-line process before they come into contact with any solid surface. Prior to coating, however, the fiber must be allowed to cool. If the fiber's temperature is too high it cannot be coated in a stable fashion by conventional materials used for coating such fibers. Therefore in current practice tall draw towers, 25 meters or more in height, are employed in order to provide sufficient distance for convection cooling of the fiber. The speed at which this drawing and coating process can be run is limited by the need to cool the fiber to a temperature that does not cause detriment to the coating polymer(s) (See, for example, Polymers for High Technology, ACS Symposium Series: 346, Chapter 34, p. 410, American Chemical Society, Washington, DC (1987) and Levin et al., The Effects of Cure Temperature on The Reaction Kinetics and Elastic Modulus of a UV-Cured Acrylate System, Polym. Mater. Sci. Eng. (1995) 72:524–525). The present inventors have unexpectedly found that radiation curable compositions comprising an alkenyl ether functional polyisobutylene can be cured at higher temperatures than those compositions used in traditional commercial processes to coat such fibers, and therefore can result in faster throughput for processing equipment. In addition, it has been found that such coatings can readily be overcoated with acrylate functional polymers.

Polyisobutylenes containing functional groups which are radiation curable have been disclosed in the art. For example, T. P. Liao and J. P. Kennedy in *Polymer Bulletin*, V. 6, pp. 135–141 (1981) disclose acryl and methacryl telechelic polyisobutylenes having the formula $CH_2=C(R)-COO-PIB-OOC-C(R)=CH_2$ where R is $-H$ or $CH_3$. These materials were prepared by reacting alpha, omega di-hydroxypolyisobutylene, $HOCH_2-PIB-CH_2OH$, and excess acryloyl or methacryloyl chloride. These prepolymers are disclosed as being useful in the synthesis of a variety of new composites containing a soft polyisobutylene segment.

J. P. Kennedy and B. Ivan in *Polymer Material Science and Engineering*, V. 58, p.866 (1988) disclose allyl telechelic linear and star-branched polyisobutylenes prepared by a convenient rapid one pot polymerization functionalization process. The polymerization step involved living polymerization of isobutylene by recently discovered mono- or multifunctional initiating systems (combinations of tert-ester and ether/Lewis acids) followed by electrophilic functionalizations by allyltrimethylsilane in the presence of $TiCl_4$. Characterization indicated quantitative end allylations. Subsequent quantitative derivations of the allyl termini yielded mono-, di-, and tri-functional hydroxyl- and epoxy-telechelic polyisobutylenes which could be cured to rubbery networks.

J. P. Kennedy and B. Ivan in the *Journal of polymer Science, Part A, Polymer Chemistry*, V. 28, p. 89 (1990) disclose mono-, di-ended linear, and three-arm star allyl telechelic polyisobutylenes which are prepared by a rapid economical one-pot polymerization-functionalization process. The process involved the living polymerization of isobutylene by mono-, di-, or tri-functional initiating systems, specifically by aliphatic and aromatic tert-ester and -ether/$TiCl_4$ combinations, followed by electrophilic functionalization of the living sites with allyltrimethylsilane. Quantitative derivations of the ally termini yielded mono-, di-, and tri-epoxy and -hydroxy-telechelic polyisobutylenes. It is further disclosed that strong rubbery networks were made by curing the epoxy-telechelic polyisobutylenes with triethylene tetramine and by reacting the hydroxy-telechelic polyisobutylenes with MDI.

J. P. Kennedy et al., in *Polymer bulletin*, V. 25, p. 633 (1991) disclose vinyl ether terminated polyisobutylene macromonomers. However, no mention was made regarding radiation curable compositions based on these macromonomers. It is known that radiation cured networks from non-telechelic chain end functional macromonomers possess poor physical properties.

N. A. Merrill, I. J. Gardner, and V. L. Hughes in RadTech North America Proceedings, V. 1, pp. 77–85 (1992) disclose conjugated diene functional polyisobutylenes which have a high reactivity to both ultraviolet and electron beam radiation. These conjugated diene functional polyisobutylenes, alone or in a formulation, are disclosed as being useful in preparing pressure sensitive adhesives.

In PCT Patent Publication No. WO 9104992 is disclosed a functionalized copolymer of isobutylene and a para-methylstyrene, wherein at least one type of functional group is attached to the para-methyl group of the para-methylstyrene, the copolymer having a substantially homogenous compositional distribution. The functionalized groups are exemplified by alkoxides, phenoxides, carboxylates, thiolates, thiopenolates, thioethers, thiocarboxylates, dithiocarboxylates, thioureas, dithiocarbamates, xanthanates, thiocyanates, silanes, halosilanes, malonates, cyanides, amides, amines, carbazoles, phthalimides, pyridine, maleimide, cyanates, and phosphines.

In PCT Patent Publication No. WO 9211295 is disclosed a radiation reactive functionalized polymer comprising an isoolefin having about 4 to about 7 carbon atoms and a para-alkylstyrene, wherein a radiation reactive functional group is attached to the para-alkyl group of the para-alkylstyrene, and discloses radiation curable pressure sensitive adhesives comprising the functionalized polymer and a tackifier. In WO'295, the radiation curable groups are disclosed as being groups such as thioxanthones, acrylates, aldehydes, ketones, and esters.

Saxena et al., U.S. Pat. No. 5,665,823, disclose a method for preparing an acrylic functional polyisobutylene polymer or copolymer, the method comprising reacting a polyisobutylene polymer or copolymer which contains at least one carbon-bonded silanol group in it molecule with a silane having both an acrylic-containing group and a silicon-bonded hydrolyzable group in its molecule.

Furthermore, radiation curable compositions which contain vinyl ether functional organosilicon compounds have also been described in the art. For example, Crivello in U.S. Pat. No. 4,617,238 discloses a photopolymerizable composition comprising (a) an organopolysiloxane having at least one Si-bonded vinyloxy functional group of the formula $H_2C=CH-O-G-$, where G is alkylene (such as propylene) or alkylene interrupted by at least one divalent heteroradical selected from $-O-$, divalent phenylene, or substituted divalent phenylene, or combination of such heteroradicals, and (b) an onium salt catalyst. The '238 patent also describes a method wherein the vinyl ether group is introduced into the organopolysiloxane by addition (hydrosilylation) of compounds with an allyl and a vinyl ether group to an SiH group of the organopolysiloxane in the presence of a platinum catalyst. In the method of the '238 patent, only the allyl group is added to the SiH group while the vinyl ether group is preserved and thus only one vinyl ether group for each SiH group can be incorporated into the siloxane molecule at any given time.

European Patent Publication No. 0462389 teaches thermosetting organopolysiloxanes with oxyalkylene vinyl ether groups bonded by SiOC groups and the vinyl groups may be substituted by alkyl groups. EPO'389 also teaches a method for the preparation of these compounds and their application as photochemically thermosetting polysiloxanes in encapsulating compounds, as non-stick coating compounds for flat carriers or as modified additives in compounds which can be thermoset radically, cationically, or by UV or electron radiation.

Brown et al., U.S. Pat. No. 5,270,423, disclose organosilicon compounds with a siloxane portion of the general formula $-OR'OCH=CHR''$ linked via an SiOC bond wherein R' is a divalent hydrocarbon group and R'' is hydrogen or an alkyl group which are useful in radiation curable compositions, in which they are mixed with an initiator. The compositions are particularly useful in UV radiation curable coatings.

Glover et al., U.S. Pat. No. 5,594,042, disclose radiation curable compositions comprising vinyl ether functional siloxanes and aromatic iodonium salt or aromatic sulfonium salt photoinitiators which cure upon exposure to ultraviolet or electron beam radiation. The vinyl ether groups are linked to the silicon atom on the siloxane through an SiOC bond and the photoinitiators are disclosed as being preferably either diaryliodonium salts of sulfonic acids or triarylsulfonium salts of sulfonic acids.

Bujanowski et al., U.S. Pat. No. 5,629,095, disclose vinyl ether functional siloxane resins, radiation curable coating compositions comprising a vinyl ether functional siloxane resin and a photocleavable acid, and a coated article obtained by applying the radiation curable coating composition to a substrate and then exposing the coating to radiation in an amount sufficient to cure the coating. In the '095 patent, the vinyl ether group in the siloxane resin is attached to the silicone atom through an SiOC bond.

Bishop et al., U.S. Pat. No. 4,514,037, disclose coating compositions for optical glass fiber which comprise 30% to about 80% of linear diacrylate-functional polyurethanes which are the reaction product of polycarbonate diol with organodiisocyanate. The linear polyurethanes are end-capped with acrylate groups and are used in combination with at least 15% monoethylenically unsaturated monomer having a glass transition temperature above about 55° C.

Shustack, U.S. Pat. No. 5,536,529, describes ultraviolet radiation-curable coatings for optical fibers and optical fibers coated therewith. The primary coating comprises a hydrocarbon polyol-based reactively terminated aliphatic urethane oligomer; a hydrocarbon monomer terminated with at least one end group capable of reacting with the terminus of the oligomer; and an optional photoinititator. The secondary coating comprises a polyester and/or polyether-based aliphatic urethane reactively terminated oligomer (I); a hydrocarbonaceous viscosity-adjusting component capable of reacting with the reactive terminal of (I); and an optional photoinitiator.

Bahadur et al. U.S. patent application Ser. No. 09/200, 038, describe a method for making alkenyl ether functional polyisobutylene polymers which are useful in curable compositions for forming coatings, sealants, caulks, adhesives, and paints.

Bahadur et al., U.S. patent application Ser. No. 09/199, 261, describe radiation curable compositions suitable for coating optical fibers comprising an alkenyl ether functional polyisobutylene, a cationic photoinitiator, a free radical photoinitiator, and optionally an alkenyl ether compound which is free of isobutylene units.

SUMMARY OF THE INVENTION

The present invention is a method for forming a coating on a substrate from radiation curable compositions comprising an alkenyl ether functional polyisobutylene, a cationic photoinitiator, and optionally a free radical photoinitiator and/or an alkenyl ether compound which is free of isobutylene units, where the substrate is at a temperature of greater than about 50° C. The coating may be overcoated with an acrylate functional polymer.

DETAILED DESCRIPTION OF THE INVENTION

This invention is a method for forming a coating on a substrate comprising the steps of (A) applying a coating of a radiation curable composition comprising (a) an alkenyl ether-functional polyisobutylene polymer in which at least 50 mole percent of the non-terminal repeating units of the polymer are isobutylene units and containing at least one group selected from the group consisting of alkenyl ether functional groups described by formulas

  (1)

and

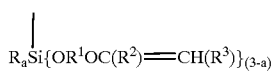  (2)

wherein R is independently selected from the group consisting of monovalent hydrocarbon groups and alkoxy groups, $R^1$ is a divalent hydrocarbon group having from 2 to 20 carbon atoms, $R^2$ and $R^3$ are independently selected from the group consisting of a hydrogen atom and a monovalent hydrocarbon group, and a has a value of 0 to 2, (b) a cationic photoinitiator, and (c) optionally a free radical photoinitiator to a substrate having a temperature greater than about 50° C., and (B) exposing the coating to an energy source selected from the group consisting of (i) ultraviolet light and (ii) visible light in an amount sufficient to cure the coating.

The method of applying the coating of the radiation curing composition to the substrate is not critical to the present invention and can be any of those known in the art for applying liquid coatings to substrates. The coating can be applied by such methods as dipping, spraying, wiping, brushing, extrusion, and coextrusion. The substrate to which the present coating is applied can be any solid substrate such as glass, metal, and plastic which can withstand temperatures greater than about 50° C. and which may benefit from a coating providing a high moisture vapor barrier, high damping characteristics, and high refractive index and which coating further provides a barrier to corrosive vapors while having good modulus, tensile strength, and toughness.

In the present method the substrate during application of the coating must be at a temperature of greater than about 50° C. to realize the benefit of the present invention. The present inventors have found that the radiation curable compositions used in the present method are stable at temperatures greater than about 50° C., with such temperatures having insignificant effects on the curing of such compositions and their physical properties after curing. The present method is particular useful for coating those substrates having a temperature within a range of greater than 80° C. to about 120° C., with temperatures within a range of greater than 80° C. to about 100° C., being optimal for the present method.

In a preferred embodiment of the present method, the method is used to apply a protective coating to a drawn glass fiber while the fiber is still hot from the drawing process. Such processes using an optical fiber drawing tower are well known in the art and are described for example in ACS Symposium Series: 346, Polymers for High Technology, Chapter 34, p.410–415 (1987) American Chemical Society, Washington, DC; and in ACS Symposium Series: 285, Applied Polymer Science, p. 907–930 (1985), American Chemical Society, Washington, DC. Briefly, this drawing process comprises feeding a preform glass rod to a furnace aligned vertically above a take-up capstan for pulling and taking up the formed and coated fiber, with various monitoring devices, polymer application devices, and curing devices positioned there between so as not to contact the bare fiber or coating until cured. A cooling region is maintained between the furnace and the coating device(s) to allow for convection cooling of the drawn glass fiber to a temperature compatible with the cure characteristic and stability of the coating polymer(s).

The alkenyl-ether functional polyisobutylene polymer useful in the radiation curable compositions of the present method can be, for example, the reaction product of a halogen substituted polyisobutylene with an alkenyl ether compound described by formula $HOR^1OC(R^2)\!=\!CH(R^3)$, where $R^1$, $R^2$, and $R^3$ are as described above and hereinafter including preferred values.

Radiation curable compositions useful in the present method are described, for example, in Bahadur, Pending U.S. Pat. Application 09/199,261, which is hereby incorporated by reference for teaching such compositions. In the coating composition as described above the monovalent hydrocarbon groups represented by R are exemplified by alkyl groups such as methyl, ethyl, propyl, butyl, hexyl, octyl, and decyl, aryl groups such as phenyl, tolyl, and xylyl, and can also be any monovalent hydrocarbon group which has at least one of its hydrogen atoms replaced with a halogen, such as fluorine, chlorine, or bromine, and these monovalent hydrocarbon groups are exemplified by $CF_3CH_2CH_2$— and $C_4F_9CH_2CH_2$—. The alkoxy groups represented by R are exemplified by methoxy, ethoxy, propoxy, and butoxy. It is highly preferred that R is independently selected from the group consisting of methyl and methoxy. Each R group can be the same or different, as desired.

Divalent hydrocarbon groups suitable as $R^1$ are exemplified by alkylene groups such as ethylene, propylene, butylene, pentylene, trimethylene, 2-methyltrimethylene, pentamethylene, hexamethylene, 3-ethyl-hexamethylene, octamethylene, decamethylene, —$(CH_2)_{18}$—, and cycloalkylene groups such as cyclohexylene, arylene groups such as phenylene. Examples of suitable divalent halohydrocarbon groups also include any divalent hydrocarbon group wherein one or more hydrogen atoms have been replaced by halogen, such as fluorine, chlorine or bromine exemplified by —$CH_2CH_2CF_2CF_2CH_2CH_2$—. Each $R^1$ can be the same or different as desired. Preferably $R^1$ is butylene.

The groups $R^2$ and $R^3$ are independently selected from a group consisting of a hydrogen atom and a monovalent hydrocarbon group exemplified by alkyl groups such as methyl, ethyl, propyl, butyl. The groups $R^2$ and $R^3$ may be the same or different. Preferably $R^2$ and $R^3$ are hydrogen atoms. In the formula above, it is preferred that subscript a have a value of zero.

For the purposes of this invention, the backbone of the alkenyl ether functional polyisobutylene polymer may be any linear or branched polymer or copolymer wherein at least about 50 mole percent, preferably at least 80 mole percent, of the repeat units are isobutylene units having the following structure:

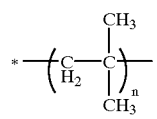

In the polymer or copolymer of the invention, the above described alkenyl ether group represented by formulas (1) or (2) can be disposed either along the chain or at the terminals thereof, or any combination of the above. As used herein, the term "polymer" is generic to polymers, oligomers, and copolymers, all of which are within the scope of this invention.

In a preferred embodiment of this invention, the alkenyl ether functional polyisobutylene polymer (a) is a polymer containing at least one group having the formula

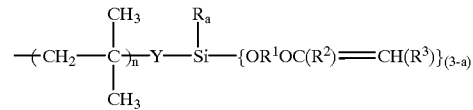

wherein at least 50 mole percent of the non-terminal repeating units of the polymer are isobutylene units, R is independently selected from the group consisting of monovalent hydrocarbon groups and alkoxy groups, $R^1$ is a divalent hydrocarbon group having from 2 to 20 carbon atoms, $R^2$ and $R^3$ are independently selected from the group consisting of a hydrogen atom and a monovalent hydrocarbon group, n has a value from 5 to 10,000, a has a value of 0 to 2, and Y is selected from the group consisting of (i) an alkylene group having from 2 to 10 carbon atoms and (ii) a group having the formula

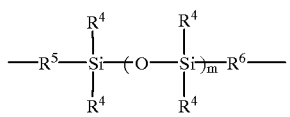

wherein $R^4$ is a monovalent hydrocarbon group, $R^5$ and $R^6$ are independently selected alkylene groups having from 2 to 10 carbon atoms, and m is an integer having a value from 1 to 5.

The groups R and $R^1$ are as defined hereinabove, including preferred embodiments thereof. Preferably, R is independently selected from the group consisting of methyl and methoxy, and $R^1$ is butylene. Preferably, a has a value of 0 or 1.

The alkylene groups of Y(i) are exemplified by ethylene, propylene, butylene, pentylene, trimethylene, 2-methyltrimethylene, pentamethylene, hexamethylene, 3-ethyl-hexamethylene, octamethylene, and decamethylene.

In the formula for Y(ii) above, the monovalent hydrocarbon groups represented by $R^4$ are as described above for R, and preferably $R^4$ is methyl. The alkylene groups represented by $R^5$ and $R^6$ are as defined above for Y(i). Preferably, $R^5$ and $R^6$ are independently selected from the group consisting of ethylene and propylene. It is highly preferred that $R^5$ is propylene, and $R^6$ is ethylene. It is also preferred that m have a value of 1.

It is preferred for purposes of this invention that from 10 to 100 weight percent of the alkenyl ether functional polyisobutylene polymer described above be used, and it is highly preferred that from 50 to 100 weight percent of this compound be employed, the weight percent being based on the total weight of the radiation curable composition.

Component (b) in the composition of this invention is a cationic photoinitiator. Suitable cationic photoinitiators are selected from the group consisting of onium salts, diaryliodonium salts of sulfonic acids, triarylsulfonium salts of sulfonic acids, diaryliodonium salts of boronic acids, and triarylsulfonium salts of boronic acids.

The onium salts are preferably selected from the group consisting of $R^7{}_2I^+MX_z{}^-$, $R^7{}_3S^+MX_z{}^-$, $R^7{}_3Se^+MX_z{}^-$, $R^7{}_4P^+MX_z{}^-$, and $R^7{}_4N^+MX_z{}^-$, wherein each $R^7$ is an organic group having from 1 to 30 carbon atoms exemplified by aromatic carbocyclic groups having from 6 to 20 carbon atoms. Each $R^7$ can be substituted with from 1 to 4 monovalent hydrocarbon groups exemplified by alkoxy groups having from 1 to 8 carbon atoms, alkyl groups having from 1 to 16 carbon atoms, nitro, chloro, bromo, cyano, carboxyl, mercapto, and aromatic heterocyclic groups exemplified by pyridyl, thiophenyl, and pyranyl. The symbol M in the formulae hereinabove are metals or metalloids which include transition metals exemplified by Sb, Fe, Sn, Bi, Al, Ga, In, Ti, Zr, Sc, V, Cr, Mn, Cs, rare earth metals exemplified by lanthanides, for example, Cd, Pr, and Nd, and metalloids exemplified by B, P, and As. The formula $MX_z{}^-$ represents a non-basic, non-nucleophilic anion exemplified by $BF_4{}^-$, $PF_6{}^-$, $AsF_6{}^-$, $SbF_6{}^-$, $SbCl_6{}^-$, $HSO_4{}^-$, $ClO_4{}^-$, $FeCl_4{}^=$, $SnCl_6{}^-$, and $BiCl_5{}^=$.

Preferred onium salts are exemplified by bis-diaryl iodonium salts, for example, bis(dodecyl phenyl) iodonium hexafluoroarsenate, bis(dodecylphenyl) iodonium hexafluoroantimonate, and dialkylphenyl iodonium hexafluoroantimonate.

Diaryliodonium salts of sulfonic acids, triarylsulfonium salts of sulfonic acids, diaryliodonium salts of boronic acids, and triarylsulfonium salts of boronic acids are also suitable as the cationic photoinitiator (b). Preferred diaryliodonium salts of sulfonic acid are diaryliodonium salts of perfluoroalkylsulfonic acids and diaryliodonium salts of aryl sulfonic acids. Preferred diaryliodonium salts of perfluoroalkylsulfonic acids are exemplified by diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethane sulfonic acid. Preferred diaryliodonium salts of aryl sulfonic acids are exemplified by diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid are triarylsulfonium salts of perfluoroalkylsulfonic acids and triarylsulfonium salts of aryl sulfonic acids. Preferred triarylsulfonium salts of perfluoroalkylsulfonic acids are exemplified by triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids are exemplified by triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids, and triarylsulfonium salts of boronic acids are compounds such as those disclosed in European Patent Application No. 0562922. Preferred diaryliodonium salts of boronic acids include diaryliodonium salts of perhaloarylboronic acids and preferred triarylsulfonium salts of boronic acids are the triarylsulfonium salts of perhaloarylboronic acid.

Preferably the amount of cationic photoinitiator (b) is from 0.01 to 5 weight percent based on the total weight of the composition, and it is highly preferred to use from 0.1 to 2 weight percent based on the total weight of the composition.

Optional component (c) in the compositions of this invention is a free radical photoinitiator. The free radical photoinitiators can be any benzoins exemplified by benzoin alkyl ethers, benzophenone and its derivatives such as 4,4'-dimethyl-amino-benzophenone (Michler's Ketone), acetophenones exemplified by dialkoxyacetophenones, dichloroacetophenones, and trichloroacetophenones, benzils exemplified by benzil ketals, quinones, and O-acylated-α-oximinoketones. Preferably the free radical photoinitiator is a compound described by formula

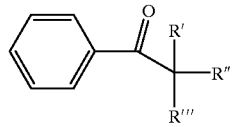

wherein R' is selected from the group consisting of —H, an alkoxy group, and a halogen atom, R" is selected from the group consisting of —OH, an alkoxy group, and a halogen atom, and R'" is selected from the group consisting of —H, an alkyl group, and a halogen atom. Preferred embodiments of this compound are (i) where R' is —H, R" is —OH and R'" is methyl or phenyl, (ii) where R' is —H, R" is an alkoxy group and R'" is phenyl (for benzoin alkyl ethers), (iii) where both R' and R" are alkoxy groups and R'" is phenyl (for benzil ketals), (iv) where both R' and R" are alkoxy groups and R'" is —H (for dialkoxyacetophenones), and (v) where both R' and R" are —Cl and R'" is —Cl or —H (for di- and tri- chloroacetophenones). It is especially preferred for the compositions that component (c) is Darocur® 1173 (2-hydroxy-2-methyl-1-phenyl-propan-1-one).

Preferably the amount of free radical photoinitiator (c) is from 0.01 to 5 weight percent based on the total weight of the composition, and it is highly preferred to use from 0.1 to 2 weight percent based on the total weight of the radiation curable composition.

The compositions of this invention can further comprise optional component (d) an alkenyl ether compound which is free of isobutylene units. Component (d) is exemplified by alkenyl ether compounds selected from the group consisting of (i) a vinyl ether compound having the formula $(CH_2=CHOR^8)_dCR^9_{4-d}$ wherein $R^8$ is a divalent hydrocarbon group having from 1 to 20 carbon atoms, $R^9$ is selected from the group consisting of hydrogen and a monovalent hydrocarbon group having from 1 to 20 carbon atoms, and d has a value of 1 to 3, (ii) a hydrocarbon silicone alkenyl ether compound having the formula

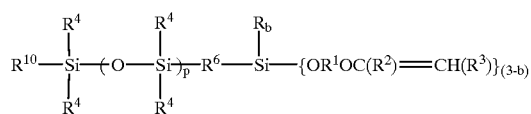

wherein $R^1$ and $R^6$ are independently selected divalent hydrocarbon groups having from 1 to 20 carbon atoms, $R^4$ is a monovalent hydrocarbon group having from 1 to 20 carbon atoms, $R^2$ and $R^3$ are independently selected from the group consisting of a hydrogen atom and a monovalent hydrocarbon group, $R^{10}$ is an alkyl group having from 8 to 16 carbon atoms, R is independently selected from the group consisting of $R^4$ and an alkoxy group, b has a value of 0 to 2, and p has a value of 0 to 1, and (iii) a long chain hydrocarbon silicone alkenyl ether compound having the formula

wherein R is independently selected from the group consisting of monovalent hydrocarbons having from 1 to 20 carbon atoms and an alkoxy group, $R^{11}$ is an alkyl group having from 8 to 16 carbon atoms, $R^2$ and $R^3$ are independently selected from the group consisting of a hydrogen atom and monovalent hydrocarbon groups, $R^1$ is a divalent hydrocarbon group having 1 to 20 carbon atom, and c has a value of 0 to 2. The monovalent and divalent hydrocarbon groups are as delineated above for the alkenyl ether functional polyisobutylene, including preferred embodiments thereof.

In the formula for component d(i), preferably $R^8$ is an alkylene group having from 1 to 6 carbon atoms, preferably methylene, $R^9$ is an alkyl group having from 1 to 10 carbon atoms, preferably ethyl, and subscript d has a value of 1 to 3. Examples of monofunctional vinyl ethers (d=1) are ethyl vinyl ether, propyl vinyl ether, butyl vinyl ether, tert-butyl vinyl ether, tert-amyl vinyl ether, hexyl vinyl ether, cyclohexyl vinyl ether, 2-ethylhexyl vinyl ether, isooctyl vinyl ether, isodecyl vinyl ether, dodecyl vinyl ether, lauryl vinyl ether, stearyl vinyl ether and tridecyl vinyl ether. Examples of difunctional vinyl-ethers within the scope of component d(i) (d=2) are butanediol divinyl ether, hexanediol divinyl ether, cyclohexane dimethanol divinyl ether, bis-(4-ethenyloxy butyl)-succinate, bis-(4-ethenyloxy butyl)-adipate, bis-(4-ethenyloxy butyl)-glutarate, bis-((4-((ethenyloxy)methyl)cyclohexyl)methyl) succinate, bis((4-((ethenyloxy)methyl)cyclohexyl)methyl) adipate, and bis-((4-((ethenyloxy)methyl)cyclohexyl)methyl) glutarate. Examples of trifunctional vinyl ethers (d=3) include trimethylolpropane trivinyl ether.

In the formula for component d(ii), preferably $R^1$ and $R^6$ are independently selected alkylene groups having from 1 to 6 carbon atoms and most preferably $R^1$ is butylene and $R^6$ is ethylene; $R^4$ is an alkyl group having from 1 to 10 carbon atoms, preferably methyl; $R^{10}$ is exemplified by octyl ($-C_8H_{17}$), decyl ($-C_{10}H_{21}$), dodecyl ($-C_{12}H_{25}$), tetradecyl ($-C_{14}H_{29}$), and hexadecyl ($-C_{16}H_{33}$), with dodecyl and hexadecyl being preferred; $R^2$ and $R^3$ are independently selected from the group consisting of a hydrogen atom and a monovalent hydrocarbon group, preferably $R^2$ and $R^3$ are each hydrogen atoms; R is independently selected from the group consisting of methyl and methoxy; preferably b has a value of 0; and preferably p has a value of 0 or 1, preferably 1.

In the formula for component d(iii), preferably $R^1$ is an alkylene group having from 1 to 6 carbon atoms and most preferably $R^1$ is butylene; R is independently selected from the group consisting of methyl and methoxy; $R^{11}$ is exemplified by dodecyl ($-C_{12}H_{25}$), tetradecyl ($-C_{14}H_{29}$), and hexadecyl ($-C_{16}H_{33}$), with dodecyl and hexadecyl being preferred; $R^2$ and $R^3$ are independently selected from the group consisting of a hydrogen atom and a monovalent hydrocarbon group, preferably $R^2$ and $R^3$ are hydrogen atoms; and preferably c has a value of 0.

Preferably the amount of Component (d) is up to 70 weight percent based on the total weight of the composition, and it is highly preferred to use from 0 to 50 weight percent based on the total weight of the radiation curable composition.

Various optional components may be used in the present composition in addition to Components (a) through (d). The photocuring of alkenyl-ether functional polymers is a cationic process. One way known in the prior art to increase cure speeds of cationic curing systems is to use one or more free radical photoinitiators and photosensitizers. The use of non-reactive diluents may be required to efficiently disperse the photocatalyst, photoinitators and photosensitizers into the polyisobutylene matrix. Preferred non-reactive diluent are hydrocarbon diluents having $C_{4-20}$ hydrocarbon chain length; long chain hydrocarbon diluents with alcohol, epoxy, ester, ether, anhydride and carbonyl functional groups. Suitable examples of such diluents include dodecylphenol, methyl laurate, methyl nonate, ethyl laurate, dioctyl adipate, di-(2-ethylhexyl) phthalate, di-2-ethylhexyl ether, dioctadecyl ether, dodecylene epoxide, hexyl glycidyl ether, succinic anhydride, and alkylphenol having from 6 to 18 carbon atoms. The alkyl group in such alkylphenols is exemplified by hexyl ($-C_6H_{13}$), octyl ($-C_8H_{17}$), decyl ($-C_{10}H_{21}$), dodecyl ($-C_{12}H_{25}$), tetradecyl ($-C_{14}H_{29}$), hexadecyl ($-C_{16}H_{33}$), and octadecyl ($-C_{18}H_{37}$), with dodecyl being preferred. A preferred non-reactive diluent is dodecylphenol. Preferably the amount of non-reactive diluent is from 0.01 to 2 weight percent, based on the total weight of the composition.

To improve thermal and oxidative stability of the cured coating one or more stabilizers may be included in the composition. Examples of suitable stabilizers are hindered amines, organic phosphites, hindered phenols and mixtures thereof such as sold under the trade names Irganox™ 1520D, Irganox™ 1010, Tinuvin™ 123, and Tinuvin™ 292 by Ciba Geigy Corporation, Terrytown, N.Y.

Preferably the amount of stabilizer is from 0.01 to 2 weight percent based on the total weight of the composition, and it is highly preferred to use from 0.05 to 0.5 weight percent based on the total weight of the composition.

To improve shelf stability of the uncured coating one or more stabilizers may be included in the composition. This requires the use of stable photoinitiator compositions as described in the U.S. Pat. No. 5,973,020. These stabilizing agents can be hindered amines with boiling points of greater than 150° C. and preferably greater than 200° C. The amine can be a primary, secondary or tertiary amine and preferably a secondary or tertiary amine. Examples are Tinuvin™ products sold by Ciba-Geigy company, CYAGARD™ products sold commercially by Cytec Corporation, Standford, Conn., and those products sold under the SANDUVAR™ trade name.

Preferably the amount of stabilizer used is from 0.01 to 2 percent by weight based upon the weight solids of the cationic photoinitiator (B) and preferably between 0.2 to 1 weight percent on the same basis.

The radiation curable compositions of this invention can also contain ingredients exemplified by reinforcing and extending fillers such as treated silicas, hydrocarbon diluents such as linear alkyl dodecylbenzene and functional hydrocarbons such as $C_{8-16}$ aliphatic glycidyl ethers, sensitizers such as 2-isopropylthioxanthone or benzophenone, colorants, dyes, preservatives, fragrances, stabilizers, and adhesion modifiers.

The radiation curable compositions of this invention can be prepared by mixing the materials described hereinabove and any optional components in any order, using any suitable mixing means, such as a spatula, a drum roller, a mechanical stirrer, a three-roll mill, a sigma blade mixer, a bread dough mixer, or a two-roll mill.

In the present method curing of the composition as a coating deposited on a substrate may be accomplished in any of the known ways, including passing a coated substrate under the desired source of radiation, for example a UV lamp, at a predetermined rate or by exposing a coated substrate to radiation by switching on the required energy source for a predetermined time.

In an additional embodiment of the present invention, an overcoat of an acrylate functional polymer containing composition may be applied to the composition comprising the alkenyl ether-functional polyisobutylene polymer. The overcoat of the acrylate functional polymer may be applied to the present composition prior to curing or after curing the radiation curable composition. The present inventors have unexpectedly found that the present radiation curable composition is sufficiently compatible with acrylate functional polymers such that uniform and defect free coatings can be made on coatings of the present radiation curable composition using standard coating techniques. Such multi-layer overcoating techniques are described, for example in ACS Symposium Series: 285 and ACS Symposium Series: 346 as cited above. In addition Taylor, U.S. Pat. No. 4,474,830, describes methods for applying multiple coatings to fibers, which such methods are hereby incorporated by reference.

Acrylate functional polymer containing compositions which may be useful for overcoating the present radiation curable compositions either in their uncured or cured state are described for example in Bishop et al., U.S. Pat. No. 4,514,037 and in Shustack, U.S. Pat. No. 5,536,529, both of which are incorporated herein by reference for teaching such useful acrylate functional polymers.

As described in Bishop et al., supra, the acrylate functional composition can comprise linear diacrylate-functional polyurethanes which are the linear polyurethane reaction product of polycarbonate diol with organic diisocyanate in molar amounts providing at least about 2 urethane linkages per molecule, these polyurethanes being end-capped with acrylate groups and being used in combination with a liquid monoethylenic unsaturated monomer having a glass transition temperature above about 55° C., where about 30% to about 80% of the reactive components in the composition are provided by the diacrylate-functional polyurethanes and at least 15% of the reactive components are provided by the monoethylenic unsaturated monomer. Diacrylate-functional terminals can be prepared, for example, by reacting the polyurethane with 2-hydroxyethyl acrylate, 2-hydroxypropyl, and 2-hydroxybutyl acrylate. The composition may contain a photoinitiator as required. The monoethylenic unsaturated monomers which may be useful in such compositions are exemplified by dimethyl acrylamide, N-vinyl pyrrolidone, isobornayl acrylate, acrylic acid, and dicyclopentenyl acrylate.

As described in Shustack, supra, the acrylate functional overcoating composition can comprise, for example, a polyester and/or polyether-based aliphatic urethane reactively terminated oligomer, a hydrocarbonaceous viscosity-adjusting component capable of reacting with the reactive terminus of the urethane oligomer, and an optional photoinitiator. More specific such overcoating compositions can comprises (I) from about 10 percent to about 90 percent by weight of an aliphatic urethane oligomer based on a polyester and/or polyether and containing a reactive terminus;

(II) from about 20 percent to about 60 percent by weight of a hydrocarbonaceous viscosity-adjusting component capable of reacting with the reactive terminus of (I); and (III) optionally from about 0.05 percent to about 10 percent by weight of a photoinitiator. A suitable base oligomer (I) can be an aliphatic urethane oligomer having a polyester and/or a polyether backbone, an example of which is an acrylated aliphatic urethane oligomer containing 75 percent oligomer solids in a hexanediol diacrylate solvent. Such oligomers include Cargill™ 1512 available from Cargill Inc., Minneapolis Minn., which comprises 75 percent by weight of an acrylated aliphatic urethane oligomer based on a polyester and a polyether in 25 percent by weight hexanediol diacrylate. Other suitable oligomers may include Photomer™ 6008, an acrylated aliphatic urethane oligomer based on a polyether, from Henkel Corporation, Ambler, Pa., and AB2010A, also an acrylated aliphatic oligomer based on a polyether from American Biltrite Inc., Lawrenceville, N.J.

In the above described acrylate-functional polyurethane comprising composition, component (II), the hydrocarbonaceous viscosity-adjusting component capable of reacting with the acrylate functionality of component (I), functions to adjust the viscosity of the composition and can also be used to adjust the hydrophobicity of the composition. Suitable such component (II) include, for example, isobornyl acrylate, isobornyl methacrylate; $C_6$ to $C_{16}$ saturated hydrocarbon diol acrylates or methacrylates such as a mixture of $C_{14}$ and $C_{15}$ diol diacrylates or dimethacrylates, hexanediol diacrylate or hexanediol dimethacrylate; isobornyl vinyl ether; $C_6$ to $C_{16}$ saturated dithiols such as hexanedithiol, decanedithiol, and cyclohexane dimethanol dithiol; $C_6$ to $C_{16}$ saturated hydrocarbon terminal dioxides such as tetradecadiene dioxide; $C_6$ to $C_{16}$ saturated hydrocarbon terminal diglycidyl ethers such as hexanediol diglycidyl ether; or mixtures thereof.

Further examples of acrylate-functional polymers suitable in overcoating compositions include aliphatic urethane acrylates such as Actilane™ 270 and Actilane™ 276 (Ackros Chemicals America, New Brunswick, N.J.) and CN 934 (Sartomer Co., Exton, Pa.); aromatic urethanes such as Actilane™ 167 (Ackros Chemicals America) and CN970 (Sartomer Co.); polyester acrylates such as Actilane™ 579 (Ackros Chemicals America); epoxy acrylates such as Actilane™ 300 and Actilane™ 310 (Ackros Chemicals America); and melamine acrylates such as Actilane™ 890 (Ackros Chemicals America).

The above described acrylate-functional polymer containing compositions can contain an optional photoinitiator, examples of which include, hydroxycyclohexylphenyl ketone and (4-octyloxyphenyl)phenyl iodonium hexafluoro antimonate.

The following examples are provided to illustrate the present invention. These examples are not intended to limit the scope of the claims herein.

EXAMPLES

Materials: The allyl functional polyisobutylene (PIB) polymer was made by Kaneka Corporation, Tokyo, JP, and is called Epion™ 200A polymer. Hydroxybutyl vinyl ether, hexanediol divinyl ether (HDDVE) and cyclohexanedimethanol divinyl ether (CHDVE) were purchased from BASF Corporation. A tolyl-(dodecylphenyl)-iodonium hexafluoroantimonate cationic photocatalyst diluted in dodecylphenol, isopropylthioxanthone and long chain alkylglycidyl ethers was used. This photocatalyst is hereinafter referred to as "iodonium catalyst". Darocur™ 1173 free radical photoinitiator (from Ciba Geigy, Terrytown, N.Y.) was used. Other solvents and common reagents used in the examples were obtained from Aldrich Chemical Company, Milwaukee, Wis. The platinum (vinylsiloxane) catalyst was prepared by the procedure of Hitchcock et. al., Angew. Chem. Int. Ed. Engl. 1991, 30. $^{13}$C and $^{29}$Si Proton nuclear magnetic resonance spectroscopy was used to confirm the structures. Molecular weight of PIB polymers was determined by gel permeation chromatography using PIB standards.

Cure Studies: The formulations were mixed in a Hauschild mixer by adding the desired amounts of components as noted in the example 3. The cure studies were conducted using a 930 model DPC (DuPont Instruments, Wilmington, Del. and a model 910 differential scanning calorimeter (DSC, DuPont Instruments) equipped with an Oriel 200 watt high pressure mercury arc lamp. The UV exposure time was controlled by a computer activated shutter blade. The UV intensity was quantified with a UV radiometer. The UV radiation passed through UV windows into a temperature controlled oven of the DuPont 910 DSC. The sample was placed in an open aluminum pan inside the DSC oven. A constant weight of approximately 10 milligrams was used for each measurement. The oven of the DSC was purged with either air or nitrogen for the testing. The sample temperature was obtained from a thermocouple which was calibrated for the melting point of indium. The data was analyzed using V4.1A DuPont 21000 software.

Example 1

A methoxysilyl-functional polymer was prepared by mixing 1 mole of Epion 200A polymer per each 2 moles of siloxane described by formula $HSi(Me)_2$—O—$Si(Me)_2$—$C_2H_4$—$Si(OMe)_3$ (see Example 1 of U.S. Pat. No. 4,808,664), at 80 degrees centigrade for one hour, in a high shear mixer. At the end of a one hour mixing time, 0.05 grams of a solution of platinum catalyst in toluene (25.2 weight percent platinum metal) was added to the mixer. After an additional 45 minutes of reaction time the heating was stopped and the reaction product was stored under inert conditions. The proton nuclear magnetic resonance spectrum of a small sample of the reaction product confirmed that the product had the following structure:

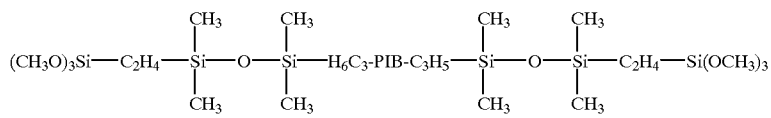

(PIB denotes the initial polyisobutylene polymer). Molecular weight data: $M_n$=5740; $M_w$ 6985; $M_w/M_n$=1.21.

Example 2

Methoxysilyl functional PIB prepared as described in example 1 was dissolved in toluene (25 weight percent solvent) in a flask equipped with a mechanical stirrer, thermometer, heating mantle, and a condenser. Hydroxybutyl vinyl ether was added to the flask at a molar ratio of 0.95:1 vinyl-ether to methoxy. 500 ppm of titaniumtetraisopropyl titanate catalyst was added and the contents of the flask were maintained at 90° C. for 1 hour. After 1 hour of heating, the flask was evacuated to approximately 100 mm Hg for methanol removal. This process was repeated three times to ensure complete reaction as measured by the consumption of hydroxy functional groups using IR spectroscopy. All volatile materials from the reaction mixture were removed using a wipe film evaporator. Proton nuclear magnetic resonance spectrum of a small sample of the product confirmed that on average more than 66% of the methoxysilyl groups had reacted. Molecular weight data: $M_n$=6810; $M_w$ 8992; $M_w/M_n$=1.32. This polymer is hereinafter referred to as POLYMER A.

Example 3

Two formulations consisting of 4 grams of Polymer A, 1 gram of a reactive diluent and 0.05 gram of a 50/50 w/w mixture of iodonium catalyst and Darocur®1 173 were prepared by mixing the materials at room temperature. Sample 3A contained HDDVE as the reactive diluent and sample 3B contained CHDVE as the reactive diluent. The samples were evaluated by DPC. The properties determined on the DPC instrument as a function of temperature are: induction time (seconds), time to "peak maximum" (seconds), percent reacted at peak, cure enthalpy (Joules/gram) and UV cure speed (Watts/gram/min.). In each measurement the sample size was held constant at 10±1 milligrams. The sample was allowed to equilibrate at the desired temperature for 5 minutes prior to exposure to UV light. DPC induction times were measured from first exposure to 1% conversion. The cure speed was calculated as the slope of the line from the onset of reaction to the peak, in the DPC curve. The results are shown in Tables 1 and 2. All results are at a constant cure energy of 100 mJ/cm$^2$.

TABLE 1

| Sample | | Temperature (° C.) | Induction time(s) | Peak Maxima (s) | % Reacted at Peak |
|---|---|---|---|---|---|
| 3A | Air | 25 | 2 | 4 | 13.6 |
|  |  | 50 | 2 | 5 | 18.2 |
|  |  | 75 | 2 | 3 | 14.0 |
|  |  | 100 | 2 | 3 | 17.3 |
| 3A | Nitrogen | 25 | 1 | 4 | 20 |
|  |  | 50 | 1 | 4 | 19 |
|  |  | 75 | 1 | 3 | 20 |
|  |  | 100 | 1 | 3 | 15 |
| 3B | Air | 26.2 | 2 | 4 | 19.1 |
|  |  | 49.5 | 2 | 5 | 21.4 |
|  |  | 73.4 | 1 | 3 | 13.4 |
|  |  | 100 | 2 | 4 | 21.7 |
| 3B | Nitrogen | 25 | 2 | 5 | 20 |
|  |  | 50 | 2 | 4 | 19 |
|  |  | 75 | 1 | 4 | 21 |
|  |  | 100 | 1 | 3 | 18 |

TABLE 2

| Sample | | Temperature (° C.) | Enthalpy (J/g) | Cure Speed (Watts/g/min) |
|---|---|---|---|---|
| 3A | Air | 25 | 106 | 184 |
|  |  | 50 | 80 | 100 |
|  |  | 75 | 100 | 222 |
|  |  | 100 | 83 | 250 |
| 3A | Nitrogen | 25 | 82 | 156 |
|  |  | 50 | 82 | 141 |
|  |  | 75 | 82 | 206 |
|  |  | 100 | 80 | 266 |
| 3B | Air | 25 | 98 | 190 |
|  |  | 50 | 69 | 96 |
|  |  | 75 | 105 | 248 |
|  |  | 100 | — | — |
| 3B | Nitrogen | 25 | 84 | 107 |
|  |  | 50 | 92 | 153 |
|  |  | 75 | 62 | 109 |
|  |  | 100 | 106 | 276 |

The results in Table 1 show that "induction time" and time to "peak maximum" occur within 2–5 seconds, which is independent of temperature. The "percent reacted at peak" values are within the 13–24 percent range at all temperatures studied. The DPC results indicate a short induction time and crisp cure response with little reaction tail at temperatures of up to 100 degrees centigrade. The total enthalpy heat generation and the cure speed values are in agreement that higher temperatures does not slow down the cure response.

Example 4

A material for forming an inner primary coating on an optical fiber was formulated as follows: Polymer A (800 g) and HDDVE (200 g) reactive diluent were mixed together in a bottle overnight. In a separate bottle, iodonium catalyst (5 g), Darocur® 1173 (5 g), and stabilizer (2 g) were mixed together to form a photocatalyst solution. The photocatalyst solution was then mixed with the Polymer A and HDDVE mixture prior to use in drawing and coating an optical fiber. The drawing and coating was carried out using a 25 meter draw tower using a single mode glass preform (from Shin-Etsu Corporation Oomiya-shi Saitama 330, JP) from which an optical fiber of 125 micron diameter was drawn. A coating of the composition as prepared above was applied on the optical fiber using a pressure applicator at a thickness of 35 microns and cured using a Fusions UV lamp. The temperature of the coating was controlled at 45° C. at the reservoir. The coating was cured by using a single Fusions 1606 lamp module with H-bulb operating at 400 Watts/in power. A standard high modulus urethane-acrylate outer primary coating was applied in a similar fashion on top of the inner primary coating. The outer primary coating was cured to a thickness of 25 microns, using three Fusions UV lamps operating at 600 Watts/in. The maximum draw speed was 900 meters/minute. This example demonstrates that an urethane-acrylate outer coating can be coated over the cured polyisobutylene polymer comprising composition.

We claim:

1. A method for forming a coating on a substrate comprising the steps of (A) applying a coating of a radiation curable composition comprising:

(a) an alkenyl ether-functional polyisobutylene polymer in which at least 50 mole percent of the non-terminal repeating units of the polymer are isobutylene units and containing at least one group having the formula

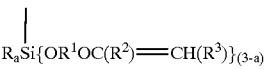

$$R_aSi\{OR^1OC(R^2)=CH(R^3)\}_{(3-a)}$$

wherein R is independently selected from the group consisting of monovalent hydrocarbon groups and alkoxy groups, $R^1$ is a divalent hydrocarbon group having from 2 to 20 carbon atoms, $R^2$ and $R^3$ are independently selected from the group consisting of a hydrogen atom and a monovalent hydrocarbon group, and a has a value of 0 to 2;

(b) a cationic photoinitiator; and (c) an optional free radical photoinitiator, to a substrate having a temperature greater than about 50° C., and (B) exposing the coating to an energy source selected from the group consisting of (i) ultraviolet light and (ii) visible light in an amount sufficient to cure the coating.

2. A method according to claim 1, wherein R is independently selected from the group consisting of methyl and methoxy, $R^1$ is butylene, $R^2$ and $R^3$ are hydrogen atoms, and a has a value of zero.

3. A method according to claim 1, wherein (a) is a polymer containing at least one group having the formula

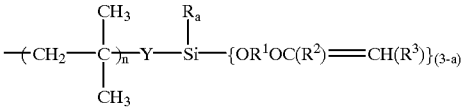

wherein at least 50 mole percent of the non-terminal repeating units of the polymer are isobutylene units, R is independently selected from the group consisting of monovalent hydrocarbon groups and alkoxy groups, $R^1$ is a divalent hydrocarbon group having from 2 to 20 carbon atoms, $R^2$ and $R^3$ are independently selected from the group consisting of a hydrogen atom and a monovalent hydrocarbon group, n has a value from 5 to 10,000, a has a value of 0 to 2, and Y is selected from the group consisting of (i) an alkylene group having from 2 to 10 carbon atoms and (ii) a group having the formula

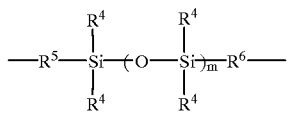

where $R^4$ is a monovalent hydrocarbon group, $R^5$ and $R^6$ are independently selected alkylene groups having from 2 to 10 carbon atoms, and m is an integer having a value from 1 to 5.

4. A method according to claim 3, wherein R is independently selected from the group consisting of methyl and methoxy, $R^1$ is butylene, $R^2$ and $R^3$ are hydrogen atoms, a has a value of 0 or 1, and Y(i) is selected from the group consisting of ethylene, propylene, butylene, pentylene, trimethylene, 2-methyltrimethylene, pentamethylene, hexamethylene, 3-ethyl-hexamethylene, octamethylene, and decamethylene.

5. A method according to claim 3, wherein R is independently selected from the group consisting of methyl and methoxy, $R^1$ is butylene, $R^2$ and $R^3$ are hydrogen atoms, $R^4$ is methyl, $R^5$ is propylene, $R^6$ is ethylene, a has a value of 0 or 1, and m has a value of 1.

6. A method according to claim 1, wherein (b) is selected from the group consisting of diaryliodonium salts of trifluoromethane sulfonic acid and triarylsulfonium salts of trifluoromethane sulfonic acid.

7. A method according to claim 1, wherein (c) is a compound described by formula

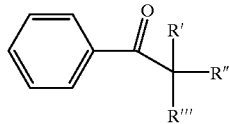

wherein R' is selected from the group consisting of —H, an alkoxy group, and a halogen atom, R" is selected from the group consisting of —OH, an alkoxy group, and a halogen atom, and R''' is selected from the group consisting of —H, an alkyl group, and a halogen atom.

8. A method according to claim 1, wherein (c) is 2-hydroxy-2-methyl-1-phenyl-propan-1-one.

9. A method according to claim 1, wherein the radiation curable composition further comprises (d) an alkenyl ether compound which is free of isobutylene units.

10. A method according to claim 9, wherein (d) is selected from the group consisting of
    (i) a vinyl ether compound having the formula $(CH_2{=}CHOR^8)_d CR^9{}_{4-d}$ wherein $R^8$ is a divalent hydrocarbon group having from 1 to 20 carbon atoms, $R^9$ is selected from the group consisting of hydrogen and a monovalent hydrocarbon group having from 1 to 20 carbon atoms, and d has a value of 1 to 3,
    (ii) a hydrocarbon silicone alkenyl ether compound having the formula

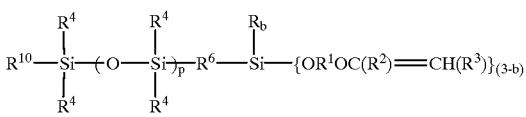

wherein $R^1$ and $R^6$ are independently selected divalent hydrocarbon groups having from 1 to 20 carbon atoms, $R^4$ is a monovalent hydrocarbon group having from 1 to 20 carbon atoms, $R^2$ and $R^3$ are independently selected from the group consisting of a hydrogen atom and a monovalent hydrocarbon group, $R^{10}$ is an alkyl group having from 8 to 16 carbon atoms, R is independently selected from the group consisting of $R^4$ and an alkoxy group, b has a value of 0 to 2, and p has a value of 0 to 1, and
    (iii) a long chain hydrocarbon silicone alkenyl ether compound having the formula

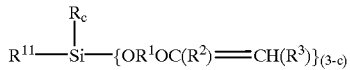

wherein each R is independently selected from the group consisting of monovalent hydrocarbons having from 1 to 20 carbon atoms and an alkoxy group, $R^{11}$ is an alkyl group having from 8 to 16 carbon atoms, $R^2$ and $R^3$ are independently selected from the group consisting of a hydrogen atom and a monovalent hydrocarbon group, $R^1$ is a divalent hydrocarbon group having 1 to 20 carbon atom, and c has a value of 0 to 2.

11. A method according to claim 1, wherein the radiation curable composition further comprises (e) an alkylphenol where the alkyl substitution has from 6 to 18 carbon atoms.

12. A method according to claim 1, wherein the temperature of the substrate is within a range of greater than 80° C. to about 120° C.

13. A method according to claim 1, wherein the substrate is a fiber.

14. A method according to claim 1, wherein the substrate is a glass fiber.

15. A method according to claim 14, wherein the temperature of the substrate is within a range of greater than 80° C. to about 100° C.

16. A method according to claim 1, wherein the coating of the radiation curable composition on the substrate is overcoated with a composition comprising an acrylate functional polyurethane.

17. A method according to claim 16, wherein the coated substrate is a glass fiber.

18. A method for forming a coating on a glass optical fiber comprising the steps of
    (A) drawing a glass fiber from a heated glass blank,
    (B) cooling the glass fiber to a temperature within a range of greater than 80° C. to about 120° C.,
    (C) applying to the glass fiber a radiation curable composition comprising
        (a) an alkenyl ether-functional polyisobutylene polymer in which at least 50 mole percent of the nonterminal repeating units of the polymer are isobutylene units and containing at least one group having the formula

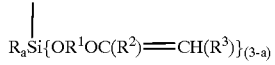

wherein R is independently selected from the group consisting of monovalent hydrocarbon groups and alkoxy groups, $R^1$ is a divalent hydrocarbon group having from 2 to 20 carbon atoms, $R^2$ and $R^3$ are independently selected from the group consisting of a hydrogen atom and a monovalent hydrocarbon group, and a has a value of 0 to 2;
        (b) a cationic photoinitiator; and (c) an optional free radical photoinitiator, and
    (D) exposing the coating of the radiation curable composition to an energy source selected from the group consisting of (i) ultraviolet light and (ii) visible light in an amount sufficient to cure the coating.

19. A method according to claim 18, wherein the coating of the radiation curable composition is overcoated with a composition comprising an acrylate functional polymer either before or after the curing of step (D).

20. A method according to claim 19, wherein the acrylate functional polymer comprises linear diacrylate-functional polyurethanes which are the linear polyurethane reaction product of polycarbonate diol with organic diisocyanate in molar amounts providing at least about 2 urethane linkages per molecule of diisocyanate, these polyurethanes being end-capped with acrylate groups and being used in combination with a liquid monoethylenic unsaturated monomer having a glass transition temperature above about 55° C., where about 30% to about 80% of the reactive components in the composition are provided by the diacrylate-functional polyurethanes and at least 15% of the reactive components are provided by the monoethylenic unsaturated monomer.

21. A method according to claim 19, wherein the composition comprising an acrylate functional polymer comprises
   (I) from about 10 percent to about 90 percent by weight of an aliphatic urethane oligomer based on a polyester and/or polyether and containing a reactive terminus;
   (II) from about 20 percent to about 60 percent by weight of a hydrocarbonaceous viscosity-adjusting component capable of reacting with the reactive terminus of (I); and
   (III) optionally from about 0.05 percent to about 10 percent by weight of a photoinitiator.

22. A method for forming a coating on a substrate comprising the steps of
   (A) applying a coating of a radiation curable composition comprising:
      (a) an alkenyl ether-functional polyisobutylene polymer in which at least 50 mole percent of the non-terminal repeating units of the polymer are isobutylene units and containing at least one group having the formula

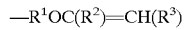
      —R$^1$OC(R$^2$)=CH(R$^3$)

where R$^1$ is a divalent hydrocarbon group having from 2 to 20 carbon atoms and R$^2$ and R$^3$ are independently selected from the group consisting of a hydrogen atom and a monovalent hydrocarbon group; (b) a cationic photoinitiator; and (c) an optional free redical photoinitiator, to a substrate having a temperature greater than about 50° C., and
   (B) exposing the coating to an energy source selected from the group consisting of (i) ultraviolet light and (ii) visible light in an amount sufficient to cure the coating.

23. A method for forming a coating on a glass optical fiber comprising the steps of
   (A) drawing a glass fiber from a heated glass blank,
   (B) cooling the glass fiber to a temperature within a range of greater than 80° C. to about 120° C.,
   (C) applying to the glass fiber a radiation curable composition comprising
      (a) an alkenyl ether-functional polyisobutylene polymer in which at least 50 mole percent of the non-terminal repeating units of the polymer are isobutylene units and containing at least one group having the formula

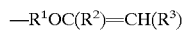
      —R$^1$OC(R$^2$)=CH(R$^3$)

wherein R$^1$ is a divalent hydrocarbon group having from 2 to 20 carbon atoms and R$^2$ and R$^3$ are independently selected from the group consisting of a hydrogen atom and a monovalent hydrocarbon group; (b) a cationic photoinitiator; and (c) an optional free radical photoinitiator, and
   (D) exposing the coating of the radiation curable composition to an energy source selected from the group consisting of (i) ultraviolet light and (ii) visible light in an amount sufficient to cure the coating.

* * * * *